US008132007B2

(12) United States Patent
Alper et al.

(10) Patent No.: US 8,132,007 B2
(45) Date of Patent: Mar. 6, 2012

(54) PANA AUTHENTICATION METHOD AND SYSTEM

(75) Inventors: Emin Yegin Alper, San Jose, CA (US); Boung-Joon Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1208 days.

(21) Appl. No.: 11/855,174

(22) Filed: Sep. 14, 2007

(65) Prior Publication Data

US 2008/0141344 A1 Jun. 12, 2008

Related U.S. Application Data

(60) Provisional application No. 60/869,133, filed on Dec. 8, 2006.

(30) Foreign Application Priority Data

Mar. 19, 2007 (KR) ........................ 10-2007-0026580

(51) Int. Cl.
*H04L 9/32* (2006.01)

(52) U.S. Cl. ........ 713/168; 713/155; 713/169; 713/170; 713/181; 380/270; 709/225; 709/229; 709/238; 726/3; 455/151.2; 370/310.1

(58) Field of Classification Search ...... 726/3; 713/155, 713/170, 168, 181, 169; 380/270; 709/225, 709/229, 238; 455/151.2; 370/310.1
See application file for complete search history.

(56) References Cited

U.S. PATENT DOCUMENTS

| | | | | |
|---|---|---|---|---|
| 5,319,710 | A * | 6/1994 | Atalla et al. | 705/75 |
| 6,084,969 | A * | 7/2000 | Wright et al. | 380/271 |
| 7,339,908 | B2 * | 3/2008 | Uhlik et al. | 370/331 |
| 7,437,559 | B2 * | 10/2008 | Ji et al. | 713/171 |
| 7,458,095 | B2 * | 11/2008 | Forsberg | 726/3 |
| 7,587,598 | B2 * | 9/2009 | Ohba et al. | 713/169 |
| 7,694,141 | B2 * | 4/2010 | Lauter et al. | 713/171 |
| 7,716,724 | B2 * | 5/2010 | Kuhn et al. | 726/8 |
| 7,860,978 | B2 * | 12/2010 | Oba et al. | 709/227 |
| 2003/0131079 | A1 * | 7/2003 | Neale et al. | 709/220 |
| 2004/0114554 | A1 * | 6/2004 | Okajima et al. | 370/329 |
| 2005/0033960 | A1 * | 2/2005 | Vialen et al. | 713/170 |
| 2005/0069137 | A1 * | 3/2005 | Landrock | 380/278 |
| 2005/0108533 | A1 * | 5/2005 | Ji et al. | 713/171 |
| 2005/0165953 | A1 * | 7/2005 | Oba et al. | 709/238 |
| 2007/0186096 | A1 * | 8/2007 | Ohba | 713/155 |

FOREIGN PATENT DOCUMENTS

JP 2006-279339 A 10/2006

OTHER PUBLICATIONS

RFC 4016, Protocol for Carrying Authentication and Network Access (PANA) Threat Analysis and Security Requirements, http.://www.faqs.org/ftp/rfc/pdf/rfc4016.txt.pdf, Mar. 2005. see abstract and Chapter 6 Threat Scenarios.

* cited by examiner

*Primary Examiner* — April Shan
(74) *Attorney, Agent, or Firm* — Sughrue Mion, PLLC

(57) ABSTRACT

A Protocol for carrying Authentication for Network Access (PANA) authentication system is provided. The system includes: a PANA client (PaC) which establishes, with a PANA authentication agent (PAA), a first PANA session and a second PANA session independent of the first PANA session, and transmits, to the PAA, a PANA update request packet requesting a binding of the first PANA session and the second PANA session; and a PAA which determines whether the first PANA session and the second PANA session are associated with an identical PaC in response to the PANA update request packet received from the PaC.

30 Claims, 4 Drawing Sheets

MAC = PANA_MAC_PRF(SESSION-1-KEY | SESSION-2-KEY, PANA_PDU)

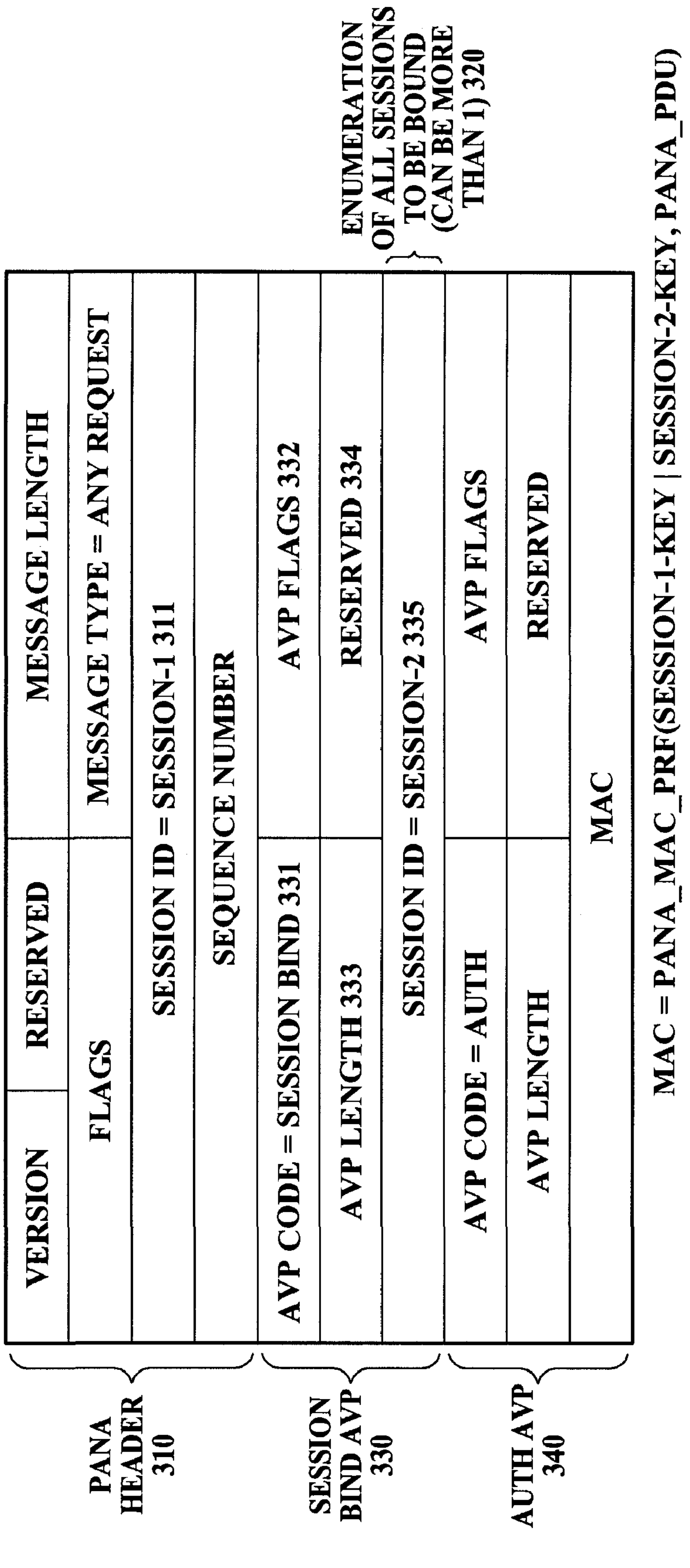

FIG. 3

| VERSION | RESERVED | MESSAGE LENGTH | |
|---|---|---|---|
| FLAGS | | MESSAGE TYPE = ANY REQUEST | |
| SESSION ID = SESSION-1 311 | | | |
| SEQUENCE NUMBER | | | |
| AVP CODE = SESSION BIND 331 | | AVP FLAGS 332 | |
| AVP LENGTH 333 | | RESERVED 334 | |
| SESSION ID = SESSION-2 335 | | | |
| AVP CODE = AUTH | | AVP FLAGS | |
| AVP LENGTH | | RESERVED | |
| MAC | | | |

PANA HEADER 310 { (rows 1–4)

SESSION BIND AVP 330 { (rows 5–7) — ENUMERATION OF ALL SESSIONS TO BE BOUND (CAN BE MORE THAN 1) 320

AUTH AVP 340 { (rows 8–10)

MAC = PANA_MAC_PRF(SESSION-1-KEY | SESSION-2-KEY, PANA_PDU)

PANA AUTHENTICATION METHOD AND SYSTEM

CROSS-REFERENCE TO RELATED APPLICATIONS

This application claims priority from a U.S. Provisional Application No. 60/869,133, filed on Dec. 8, 2006, in the U.S. Patent and Trademark Office, and Korean Patent Application No. 10-2007-0026580, filed on Mar. 19, 2007, in the Korean Intellectual Property Office, the entire disclosure of both of which are incorporated herein by reference.

BACKGROUND OF THE INVENTION

1. Field of the Invention

Methods and apparatuses consistent with the present invention relate to an authentication in a network environment, and more particularly, to an authentication in an Internet protocol (IP)-based network environment. An IP environment includes an IP version 4 (IPv4) environment and an IPv6 environment.

2. Description of Related Art

Protocol for carrying Authentication for Network Access (PANA) is an authentication protocol developed for network access by Internet Engineering Task Force (IETF). PANA is described in a request for comments (RFC) 4016, RFC 4058, and the like. PANA is a protocol for performing authentication in a network layer. PANA is designed to perform authentication regardless of a link-layer protocol in an Internet protocol (IP)-based environment, and may be applied to both multi-point access and point-to-point access.

FIG. 1 is a diagram illustrating a device authentication and a user authentication in a World Interoperability for Microwave Access (WiMAX) environment according to a conventional art.

Several network technologies including Wireless Broadband Internet (WiBro), WiMAX, and the like request the device authentication and the user authentication to be separately performed. As illustrated in FIG. 1, a mobile station (MS) 110 performs a device authentication 105 and a user authentication 125 with an access service network gateway (ASN GW) 130 via a base station (BS) 120. In this instance, a Privacy and Key Management version 2 (PKMv2) scheme may be used. The ASN GW 130 performs communication again by using an authentication, authorization, and account (AAA) server 140 in an ASN, and Remote Authentication Dial-In User Service (RADIUS) in order to perform a device authentication of the MS 110 (115). When an authentication by the AAA server 140 is successful, the ASN GW 130 performs a user authentication. The ASN GW 130 performs communication again by using an AAA server 150 in a home Connectivity Service Network (CSN), and RADIUS in order to authenticate a user of the MS 110 (135). When the authentication by the AAA server 150 is successful, enabling of full IP access is permitted to the MS 110 (145).

As described above, since the device authentication and the user authentication are previously only able to be performed sequentially in the WiMAX environment, a long initial establishment time is required until the MS 110 acquires a full IP access authority.

As another example, there is a case where a network access provider (NAP) authentication and an Internet service provider (ISP) authentication are separately performed. In this case, since the ISP authentication is performed after the NAP authentication is completed, a long total authentication time is required.

Accordingly, a PANA authentication system and method which can reduce total authentication time is required.

SUMMARY OF THE INVENTION

An aspect of the present invention provides a method and system of performing at least two authentication sessions in parallel, thereby reducing a total authentication time.

Another aspect of the present invention also provides a method and system of binding at least two authentication sessions performed in parallel since the at least two authentication sessions are performed in parallel as described above.

Another aspect of the present invention also provides a method and system of correlating or binding at least two Protocol for carrying Authentication for Network Access (PANA) sessions.

According to an aspect of the present invention, there is provided a PANA authentication system, the system including: a PANA client (PaC) which establishes, with a PANA authentication agent (PAA), a first PANA session and a second PANA session independent of the first PANA session, and transmits, to the PAA, a PANA update request packet requesting a binding of the first PANA session and the second PANA session; and a PAA which concludes that the first PANA session and the second PANA session are associated with an identical PaC in response to the PANA update request packet received from the PaC.

In an aspect of the present invention, the method further includes: determining whether first authentication and second authentication succeed; authenticating the PANA update request packet with reference to the MAC; and transmitting a PANA update acknowledgement packet to the PaC.

According to another aspect of the present invention, there is provided a PANA authentication method, the method including: establishing a first PANA session with a PAA; establishing, with the PAA, a second PANA session independent of the first PANA session; and transmitting, to the PAA, a PANA update request packet requesting a binding of the first PANA session and the second PANA session. The second PANA session starts before completion of the first PANA session, and the first PANA session and the second PANA session are progressed in parallel.

In an aspect of the present invention, the PANA update request packet includes a session key of the first PANA session and a session key of the second PANA session. The PANA update request packet includes attribute value pairs (AVP) including an AVP code for a session binding. The PANA update request packet includes a message authentication code (MAC) in a MAC field of AUTH AVP of the PANA update request packet, the MAC being generated by a combination of the session key of the first PANA session and the session key of the second PANA session. A message authentication code (MAC) is also called as a message integrity code (MIC).

According to still another aspect of the present invention, there is provided a PANA authentication method, the method including: establishing a first PANA session with a PaC; establishing, with the PaC, a second PANA session independent of the first PANA session; receiving, from the PaC, a PANA update request packet requesting a binding of the first PANA session and the second PANA session; and concluding that the first PANA session and the second PANA session are associated with an identical PaC.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIG. 3 is a diagram illustrating a PANA update request packet according to an exemplary embodiment of the present invention.

DETAILED DESCRIPTION OF EXEMPLARY EMBODIMENTS

Figure 1:
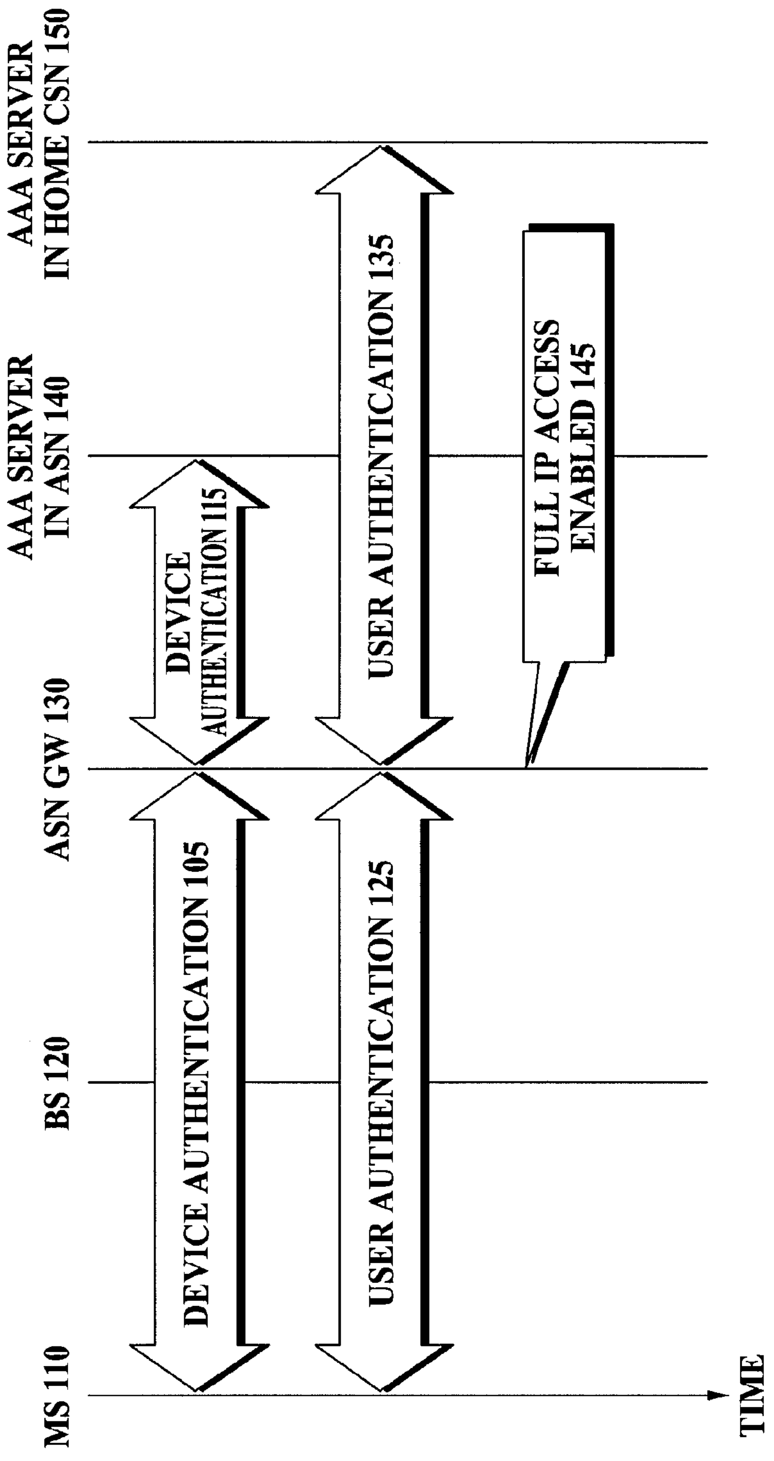
FIG. 1 is a diagram illustrating a device authentication and a user authentication in a World Interoperability for Microwave Access (WiMAX) environment according to a conventional art.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 2:
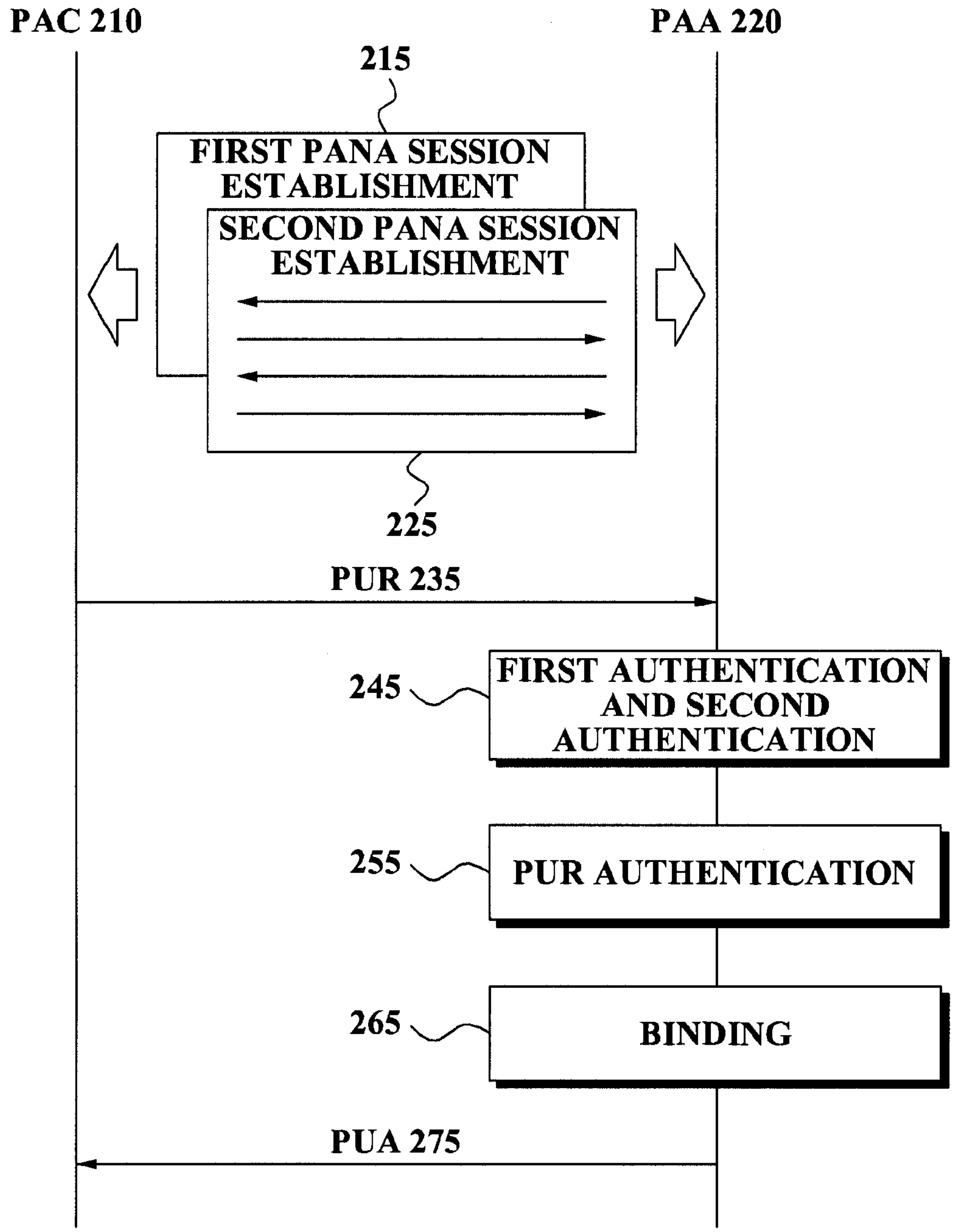
FIG. 2 is a diagram illustrating a Protocol for carrying Authentication for Network Access (PANA) authentication method according to an exemplary embodiment of the present invention.

FIG. 2 is a diagram illustrating a Protocol for carrying Authentication for Network Access (PANA) authentication method according to an exemplary embodiment of the present invention.

A PANA client (PaC) 210 is a module residing in an access device such as a laptop, a personal digital assistant (PDA), and the like. The PaC 210 according to the present exemplary embodiment may be embodied by a computer program and/or a hardware device included in the access device. The PaC 210 is responsible for providing a credential in order to prove an authentication. A PANA authentication agent (PAA) 220 verifies the credential provided by the PaC 210, and authorizes the access device.

In operation 215, a first PANA session is established between the PaC 210 and the PAA 220. The PANA session starts by a handshake between the PaC 210 and the PAA 220, and is completed depending on a result of the authentication. The PaC 210 and the PAA 220 may exchange data at a plurality of times during one PANA session. In operation 225, a second PANA session independent of the first PANA session is established between the PaC 210 and the PAA 220.

The first PANA session is a session for a first authentication, and the second PANA session is a session for a second authentication. For example, the first PANA session is a session for a network access provider (NAP) authentication, and the second PANA session is a session for an Internet service provider (ISP) authentication. For another example, the first PANA session is a session for a device authentication, and the second PANA session is a session for a user authentication. When the present exemplary embodiment is applied to a World Interoperability for Microwave Access (WiMAX) environment, the first PANA session is the session for the device authentication, and the second PANA session is the session for the user authentication.

Although the second PANA session starts after the first PANA session is completed according to a conventional art, the second PANA session starts before completion of the first PANA session according to the present exemplary embodiment. Since the first PANA session and the second PANA session are performed in parallel in the present exemplary embodiment, total authentication time is reduced. The first PANA session and the second PANA session are independently established in the present exemplary embodiment. Each PANA session generates a session key of each PANA session.

In operation 235, the PaC 210 transmits, to the PAA 220, a PANA notification request packet (PNR) requesting a binding of the first PANA session and the second PANA session. Sessions to bind are designated in the PNR. Also, information to prove possession of the sessions is included in the PNR. The PNR includes a session key of the first PANA session and a session key of the second PANA session. The PNR includes attribute value pairs (AVP) including an AVP code for a session binding. The PNR includes a message authentication code (MAC) in AUTH AVP of the PNR, the MAC being generated by a combination of the session key of the first PANA session and the session key of the second PANA session. The PNR is described in detail with reference to FIG. 3 as follows.

The PAA 220 receiving the PNR from the PaC 210 determines whether the first authentication associated with the first PANA session, and the second authentication associated with the second PANA session succeed, in response to the PNR, in operation 245. For example, the first PANA session is the session for the NAP authentication, and the second PANA session is the session for the ISP authentication. In this case, the PAA 220 determines whether both the NAP authentication and the ISP authentication succeed. Also for another example, the first PANA session is the session for the device authentication, and the second PANA session is the session for the user authentication. In this case, the PAA 220 determines whether both the device authentication and the user authentication succeed. When at least one of the first authentication and the second authentication fails, the PAA 220 transmits appropriate information to the PaC 210.

When both the first authentication and the second authentication succeed in operation 245, the PAA 220 authenticates the PNR with reference to the MAC included in the PNR in operation 255. The MAC is generated by the combination of the session key of the first PANA session and the session key of the second PANA session, and is included in the PNR by the PaC 210. For example, the MAC may be generated by Equation 1.

MAC=PANA_MAC_PRF (the session key of the first PANA session|the session key of the second PANA session, PANA_PDU). [Equation 1]

First, the session key of the first PANA session and the session key of the second PANA session are appended to each other. Next, a combined key is used for hashing PANA_PDU corresponding to a payload of the PNR. Specifically, the MAC may be generated by hashing the payload of the PNR by a key in which the session key of the first PANA session and the session key of the second PANA session are combined. In this case, the PAA 220 may authenticate the PNR by using an identical hash function as the PaC 210. The hash function may be selected from among various hash functions.

The PAA 220 associates two sessions being independent for each other by the PNR of the PaC 210. For this, it is required to prove that the PaC 210 includes the sessions. The PAA 220 verifies that the PaC 210 includes the sessions by using the MAC.

In operation 255, the PAA 220 concludes that the first PANA session and the second PANA session are associated with an identical PaC. In this case, the PAA 220 correlates the first authentication associated with the first PANA session, and the second authentication associated with the second PANA session. Also, when other work related to the association is required, the PAA 220 performs the other work. The PAA 220 makes an appropriate authorization decision. Accordingly, the two sessions are logically bound. However, although the two sessions are logically bound, the two sessions are still independently managed. For example, the two sessions may be independently completed for each other.

In operation 275, the PAA 220 transmits a PANA update acknowledgement packet (PNA) to the PaC 210.

Although a case where two PANA sessions are bound in the above-described exemplary embodiment, the present exemplary embodiment is also applicable to at least three PANA sessions. In this case, the MAC may be generated by using session keys of the at least three PANA sessions.

FIG. 3 is a diagram illustrating a PANA update request packet according to an exemplary embodiment of the present invention.

The PNR generally includes a PANA header 310, AVP, and AUTH AVP 340.

As illustrated in FIG. 3, the PNR according to the present exemplary embodiment includes the session bind AVP 330 including an AVP code for a session binding. The AVP are referred to as the session bind AVP 330 in the present exemplary embodiment. The session bind AVP 330 include the AVP code for the session binding in a field 331. Therefore, a PAA determines whether the corresponding AVP are the session bind AVP, depending on the present exemplary embodiment with reference to the AVP code of the field 331. AVP flags 332 are two-octets, and are in accordance with an AVP definition within PANA. An AVP length 333 is two-octets, and indicates a length of the session bind AVP 330 for each octet. A reserved field 334 is used for future use.

A field 335 includes the session key of the session to bind. When there are two sessions to bind, the session key of the first PANA session is stored in the field 311, and the session key of the second PANA session is stored in the field 335. When there are at least three sessions to bind, the field 335 stores the session key of all sessions following the second PANA session. For example, when there are three sessions to bind, the session key of the first PANA session is stored in the field 311, and the session key of the second PANA session and the session key of the third PANA session are stored in the field 335. Specifically, in the present exemplary embodiment, only the field 335 is additionally allocated to the session keys added by binding.

A MAC field 341 of the AUTH AVP 340 includes a MAC. The MAC is generated, by a PaC, by a combination of the session keys of the sessions to bind. When the sessions to bind are the first PANA session and the second PANA session, the MAC is generated by a combination of the session key of the first PANA session and the session key of the second PANA session.

Remaining fields except for the field 311 in the PANA header 310, and the AUTH AVP 340 are same as the conventional art, and thus a description thereof is omitted.

Figure 4:
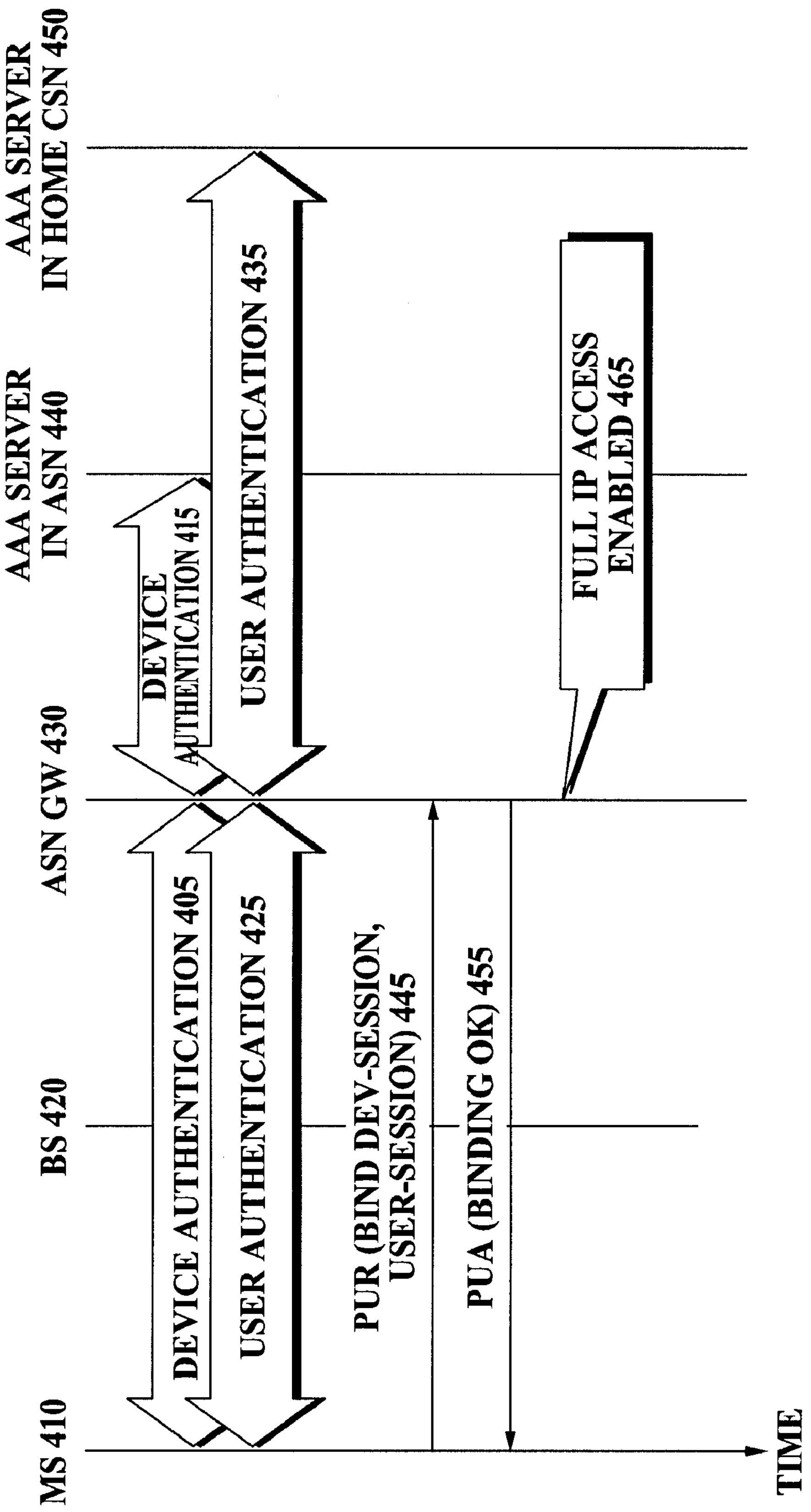
FIG. 4 is a diagram illustrating a method of applying the present invention to a WiMAX environment and performing a device authentication and a user authentication.

FIG. 4 is a diagram illustrating a method of applying the present invention to a WiMAX environment and performing a device authentication and a user authentication.

A PaC according to the present exemplary embodiment is run in a mobile station (MS) 410, and a PAA according to the present exemplary embodiment is run in an access service network gateway (ASN GW) 430. There are two separate authentications including the device authentication and the user authentication in the WiMAX environment. The device authentication may be performed by an access service provider (ASP) managing the ASN GW 430. Also, the user authentication may be performed by a network service provider (NSP) being a user's home ISP.

The MS 410 performs a device authentication 405 with the ASN GW 430 via a base station (BS) 420. PANA is used for communication between the MS 410 and the ASN GW 430. The ASN GW 430 performs communication again by using an authentication, authorization, and account (AAA) server 440 in an ASN, and Remote Authentication Dia In User Service (RADIUS) is used in order to perform a device authentication of the MS 410 (415). The device authentication takes place between the MS 410 and the ASN GW 430.

An AAA server 450 for the user authentication resides in an NSP network. The MS 410 performs a user authentication 425 with the ASN GW 430 via the BS 420. PANA is used for communication between the MS 410 and the ASN GW 430. The ASN GW 430 performs communication again by using an AAA server 450 in a home connectivity service network (CSN), and RADIUS is used in order to perform a user authentication of the MS 410 (435). The user authentication takes place between the MS 410 and the ASN GW 430.

When the present exemplary embodiment is used, the device authentication 405 and the user authentication 425 may be performed in parallel.

When both the device authentication 405 and the user authentication 425 succeed, the ASN GW 430 knows a result of the device authentication 405 and the user authentication 425. The ASN GW 430 and the MS 410 exchange a PNR 445 and a PNA 455. The ASN GW 430 enables full IP access permission for the MS 410 after combining the result of the device authentication 405 and the user authentication 425. The two sessions are logically bound. However, although the two sessions are logically bound, the two sessions are still and independently managed. For example, the two sessions may be completed independently from each other.

The present exemplary embodiment may be applied to performing a plurality of sessions in parallel such as a configuration of performing both the device authentication and the user authentication in parallel, a configuration of performing both the session for the NAP authentication and the session for the ISP authentication in parallel, and the like.

The above-described exemplary embodiments of the present invention include computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

According to the present invention, there is provided a method of performing at least two authentication sessions in parallel. According to the present invention, the at least two authentication sessions are performed in parallel, thereby reducing total authentication time, and improving performance. In particular, as a number of authentication sessions to bind is increased, performance improvement according to the present invention is significantly increased.

According to the present invention, there is provided a method of associating at least two independent authentication sessions while using a PANA protocol. According to the present invention, the associated at least two authentication sessions may still be independently performed. For example, the sessions may be independently completed after being associated.

According to the present invention, there is provided a method of performing a NAP authentication and an ISP authentication in parallel. According to the present invention, the NAP authentication and the ISP authentication are performed in parallel, thereby reducing total authentication time, and improving performance.

According to the present invention, there is provided a method of performing in parallel a device authentication and a user authentication in a WiMAX environment and/or a WiBro environment. According to the present invention, the device authentication and the user authentication are performed in parallel, thereby reducing total authentication time, and improving performance.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An authentication system for a Protocol for carrying Authentication for Network Access (PANA), the system comprising:

a PANA client (PaC) comprising a hardware processor configured to establish a first PANA session with a PANA authentication agent (PAA), establish a second PANA session with the PAA, independent of the first PANA session, and transmit to the PAA, a PANA update request packet requesting a binding of the first PANA session and the second PANA session; and wherein the PAA comprising a hardware processor configured to determine whether the first PANA session and the second PANA session are associated with the PaC in response to the received PANA update request packet, wherein the PaC is further configured to generate a message authentication code (MAC) included in the PANA update request packet by combining a session key of the first PANA session and a second key of the second PANA session to generate a combined key and hashing a payload of the PANA update request with the combined key.

2. The system of claim 1, wherein the PANA update request packet comprises the session key of the first PANA session and the session key of the second PANA session.

3. The system of claim 2, wherein the PANA update request packet comprises attribute value pairs (AVP) including an AVP code for session binding.

4. The system of claim 3, wherein the AVP comprise the session key of the second PANA session.

5. A non-transitory computer-readable recording medium storing software instructions for enabling a computer to implement an authentication method for a Protocol for carrying Authentication for Network Access (PANA), the software instructions comprising:

establishing a first PANA session with a PANA Authentication Agent (PAA);

establishing a second PANA session independent of the first PANA session with the PAA; and transmitting, from a PANA client (PaC) to the PAA, a PANA update request packet requesting a binding of the first PANA session and the second PANA session, wherein the PANA update request packet includes a message authentication code (MAC) which is generated by the PaC by combining a session key of the first PANA session and a session key of the second PANA session to generate a combined key and hashing a payload of the PANA update request packet with the combined key.

6. The non-transitory computer-readable recording medium of claim 5, wherein the PANA update request packet comprises the session key of the first PANA session and the session key of the second PANA session.

7. The non-transitory computer-readable recording medium of claim 6, wherein the PANA update request packet comprises attribute value pairs (AVP) including an AVP code for session binding.

8. The non-transitory computer-readable recording medium of claim 7, wherein the AVP comprise the session key of the second PANA session.

9. The non-transitory computer-readable recording medium of claim 8, wherein, when another PANA session to bind exists, the AVP comprise a session key of the other PANA session.

10. The non-transitory computer-readable recording medium of claim 7, wherein the MAC is stored in a MAC field of the AVP of the PANA update request packet.

11. The non-transitory computer-readable recording medium of claim 5, wherein the second PANA session starts before completion of the first PANA session.

12. The non-transitory computer-readable recording medium of claim 5, wherein the first PANA session is a session for a network access provider (NAP) authentication, and the second PANA session is a session for an Internet service provider (ISP) authentication.

13. The non-transitory computer-readable recording medium of claim 5, wherein the first PANA session is a session for a device authentication, and the second PANA session is a session for a user authentication.

14. A non-transitory computer-readable recording medium storing software instructions for enabling a computer to implement an authentication method for a Protocol for carrying Authentication for Network Access (PANA), the software instructions comprising:

establishing a first PANA session with a PANA Authentication Client (PaC);

establishing a second PANA session independent of the first PANA session, with the PaC;

receiving a PANA update request packet requesting a binding of the first PANA session and the second PANA session, from the PaC; and determining whether the first PANA session and the second PANA session are associated with the PaC based on the PANA update request packet, wherein the PANA update request packet includes a message authentication code (MAC) which is generated by the PaC by combining a session key of the first PANA session and a session key of the second PANA session to generate a combined key and hashing a payload of the PANA update request packet with the combined key.

15. The non-transitory computer-readable recording medium of claim 14, wherein the PANA update request packet comprises the session key of the first PANA session and the session key of the second PANA session.

16. The non-transitory computer-readable recording medium of claim 15, wherein the first PANA session is a session for a first authentication, and the second PANA session is a session for a second authentication.

17. The non-transitory computer-readable recording medium of claim 16, wherein the first PANA session is a session for a network access provider (NAP) authentication, and the second PANA session is a session for an Internet service provider (ISP) authentication.

18. The non-transitory computer-readable recording medium of claim 16, wherein the first PANA session is a session for a device authentication, and the second PANA session is a session for a user authentication.

19. The non-transitory computer-readable recording medium of claim 16, wherein the software instructions further comprise determining whether the first authentication and the second authentication succeed.

20. The non-transitory computer-readable recording medium of claim 19, wherein the software instructions further comprise authenticating the PANA update request packet with reference to the MAC.

21. The non-transitory computer-readable recording medium of claim 20, wherein the software instructions further comprise transmitting a PANA update acknowledgement packet to the PaC.

22. The non-transitory computer-readable recording medium of claim 14, wherein the PANA update request packet comprises attribute variable pairs (AVP) including an AVP code for session binding.

23. The non-transitory computer-readable recording medium of claim 22, wherein the AVP comprise the session key of the second PANA session.

24. The non-transitory computer-readable recording medium of claim 14, wherein the second PANA session starts before completion of the first PANA session.

25. An authentication method for a Protocol for carrying Authentication for Network Access (PANA), the method comprising:

establishing, by a PANA client (PaC) including a hardware processor, a first PANA session with a PANA Authentication Agent (PAA);

establishing, by the PaC, a second PANA session independent of the first PANA session, with the PAA; and transmitting, from the PaC to the PAA, a PANA update request packet requesting a binding of the first PANA session and the second PANA session, wherein the PANA update request packet includes a message authentication code (MAC) which is generated by the PaC by combining a session key of the first PANA session and a session key of the second PANA session to generate a combined key and hashing a payload of the PANA update request packet with the combined key.

26. The method of claim 25, wherein the second PANA session starts before completion of the first PANA session.

27. An authentication method for a Protocol for carrying Authentication for Network Access (PANA), the method comprising:

establishing, by a PANA client (PaC) including a hardware processor, a first PANA session with a PANA Authentication Client (PaC);

establishing a second PANA session independent of the first PANA session, with the PaC;

receiving a PANA update request packet requesting a binding of the first PANA session and the second PANA session, from the PaC; and determining whether the first PANA session and the second PANA session are associated with the PaC based on the PANA update request packet, wherein the PANA update request packet includes a message authentication code (MAC) which is generated by the PaC by combining a session key of the first PANA session and a session key of the second PANA session to generate a combined key and hashing a payload of the PANA update request packet with the combined key.

28. The method of claim 27, wherein the PANA update request packet comprises attribute variable pairs (AVP) including an AVP code for session binding.

29. The method of claim 28, wherein the AVP comprise the session key of the second PANA session.

30. The method of claim 27, wherein the second PANA session starts before completion of the first PANA session.

* * * * *

UNITED STATES PATENT AND TRADEMARK OFFICE

CERTIFICATE OF CORRECTION

PATENT NO. : 8,132,007 B2
APPLICATION NO. : 11/855174
DATED : March 6, 2012
INVENTOR(S) : Emin Yegin Alper et al.

It is certified that error appears in the above-identified patent and that said Letters Patent is hereby corrected as shown below:

Title page, Item (75) [Boung-Joon Lee] should read --Byoung-Joon Lee--.

Signed and Sealed this
Tenth Day of July, 2012

David J. Kappos
*Director of the United States Patent and Trademark Office*